United States Patent [19]

Hoover et al.

[11] Patent Number: 6,110,516

[45] Date of Patent: Aug. 29, 2000

[54] PROCESS FOR TREATING FOODS USING SACCHARIDE ESTERS AND SUPERATMOSPHERIC HYDROSTATIC PRESSURE

[75] Inventors: Dallas G. Hoover, Newark, Del.; Cynthia M. Stewart, Union, N.J.; Charles Patrick Dunne, Framingham; Anthony Sikes, Leominster, both of Mass.

[73] Assignees: University of Delaware, Newark, Del.; The United States of America as represented by the Secretary of the Army, Washington, D.C.

[21] Appl. No.: 09/230,130

[22] PCT Filed: Nov. 13, 1998

[86] PCT No.: PCT/US98/24294

§ 371 Date: Jan. 19, 1999

§ 102(e) Date: Jan. 19, 1999

[87] PCT Pub. No.: WO99/25206

PCT Pub. Date: May 27, 1999

Related U.S. Application Data

[60] Provisional application No. 60/065,312, Nov. 13, 1997.

[51] Int. Cl.$^7$ .......................... A23L 3/015; A23L 3/3463; A23L 3/3562

[52] U.S. Cl. .......................... 426/321; 426/323; 426/442; 426/468; 426/532

[58] Field of Search .................................. 426/321, 323, 426/532, 442, 468

[56] References Cited

U.S. PATENT DOCUMENTS 5,476,677  12/1995  Inoue et al. .............................. 426/618

OTHER PUBLICATIONS

David, Jairus. *Aseptic Processing and Packaging of Food.* CRC Press, 1996, pp. 6–19.

*Safety and Nutritional Adequacy of Irradiated Food.* World Health Organization, Geneva, 1994, pp. 22–28.

International Conference of Agricultural Research Institute. *Safeguarding the Food Supply through Irradiation Processing Techniques.* Orlando, Florida, 1992, pp. 13–14.

Calderon, M. *Food Preservation by Modified Atmospheres.* CRC Press, 1990, pp. 4–8.

Hayakawa et al. "Oscillatory Compared with Continuous Pressure Sterilization on *Bacillus stearothermophilus* spores". Journal of Food Science, vol. 59, pp. 167, 1994.

Suwa et al. "Effects of Food Emulsifiers on Spoilage of Canned Coffee Caused by Thermophilic Spore Forming Bacteria". Journal of Japanese Society of Food Science and Technology, vol. 35 (10) 706–708 (Abstract only), 1988.

Journal of Japanese Society of Food Science and Technology, vol. 35 (10) 706–708 (Abstract only), 1988.

*Primary Examiner*—Helen Pratt
*Attorney, Agent, or Firm*—Connolly Bove Lodge & Hutz, LLP

[57] ABSTRACT

In the disclosed treatment of foods or foodstuffs (particularly liquid and semi-liquid or semi-solid foods and solid foods such as meats and stews), the food or foodstuff is subjected to very high hydrostatic pressures in the presence of a saccharide ester (e.g. sucrose mono-, di-, and/or tri-$C_8$–$C_{24}$-fatty acid esters) at temperatures above 35° C. but preferably below 60° C. for a relatively short period of time (less than 60 minutes). This treatment is effective in essentially eliminating sporeforming organisms, whether in the form of spores or in the vegetative state.

22 Claims, No Drawings

PROCESS FOR TREATING FOODS USING SACCHARIDE ESTERS AND SUPERATMOSPHERIC HYDROSTATIC PRESSURE

This application claims benefit of Provisional Appl. 60/065,312 filed Nov. 13, 1997.

The U.S. Government has rights in this invention pursuant to Contract No. DAAK60-95-C-2060 awarded by the Department of the Army.

FIELD OF THE INVENTION

This invention relates to a process for treating foods or foodstuffs for the purpose of substantially eliminating microorganisms. An aspect of this invention relates to a method for elimination of sporulated and/or sporeforming food-spoilage microorganisms from foods. A further aspect of this invention relates to a bactericidal process for treating foods which are adversely affected by elevated temperatures but are not substantially affected adversely by superatmospheric pressure.

DESCRIPTION OF THE PRIOR ART

A wide variety of microorganisms can be found in raw and partially processed foods and even in some fully processed foods. The microorganisms of greatest concern to food product manufacturers and food consumers are generally bacteria which produce toxins or which have food-spoilage effects. Many of these bacteria are temperature-sensitive and can be killed—or at least significantly reduced in population—by heat treatments such as canning, pasteurization, and aseptic processing. Other means of controlling bacterial populations involve irradiation, hermetically-sealed-in growth-inhibiting atmospheres, and the addition of chemicals such as food preservatives, e.g. sorbates, and/or changes in the natural pH of the foodstuff.

One common practice in this art is to modify the atmosphere in the container which stores the food, thereby providing a safer environment for food storage. For example, hermetic or air-tight storage has been used to seal off the food container and store the food under a gas mixture which contains very little oxygen and a large amount of carbon dioxide (compared to the normal atmospheric concentration). The high-$CO_2$ atmosphere in the container prevents growth of oxygen-utilizing organisms. However, this storage technique does not necessarily hinder the growth of either anaerobic bacteria or sporeforming microorganisms.

Heat can be a potent weapon against bacteria. Antibacterial effects are obtained with thermal processing of the food itself and with thermal treatment of the containers used to store the food. In thermal processing, temperatures can be below 100° C. or heat can be applied in the form of wet steam (at about 100° C.) or superheated steam (>100° C.). Canning generally involves a steam treatment of the container, whereas processes such as pasteurization (used primarily for dairy products and beverages) is a direct treatment of the food itself. Some control over bacterial populations is obtained at temperatures as low as 60° C., since the life processes and some essential enzymes are damaged or disrupted and can even become inoperative at temperatures above 37° C. Some enzymes, for example, are completely and permanently denatured at temperatures as low as 50° C. (By contrast, cooling to temperatures well below 37°, e.g. 10° C. or less can inhibit or temporarily inactivate bacterial life processes and enzymes, but the effect is not permanent, and the bacteria can resume reproductive and other life processes when the temperature of their environment returns to 20 to 40° C.)

There are, however, serious limitations on the use of heat to kill bacteria in foods. Just as enzymes can be denatured by modestly elevated temperatures, so can raw and partially processed foods. Even foods which are normally cooked at relatively high temperatures before being consumed oftentimes cannot be sold in a pre-cooked form. It is generally unacceptable to treat highly temperature-sensitive foods at temperatures much above 60 or even 50° C.

Canning is a severe form of heat treatment that will inactivate heat-resistant microorganisms, including bacterial spores, but due to the limitations of all heat-treatment methods, described above, canning is most often used for foods such as chunky fruits and soups with meat and vegetables. The canned food of commerce is sterile. Hence, canning is virtually the only food preservation method which is effective against bacterial spores.

Sporeforming microorganisms which have food-spoilage effects can be particularly difficult to deal with. Bacterial spores are resistant to most types of sterilization except for heat treatments in which the temperature reaches 130 to 145° C. Once these microorganisms have formed spores, the spores tend to be resistant to damage from pressure, moderate temperatures, and many chemical additives.

Sporeforming microorganisms and bacterial spores can resist, inter alia, irradiation treatments and aseptic processing and packaging. Irradiation is useful for protecting raw meats, fruits, dairy products, grains, and vegetables from aerobic, non-sporeforming microorganisms, some molds, and some insects. Bacterial spores are generally unaffected by irradiation.

Aseptic processing/packaging is a sterilization method that was developed to avoid denaturing foods that cannot withstand the harsh conditions of conventional thermal processing. This method uses so-called "UHT" (ultra-high temperature) treatments which are extremely brief. That is, the heat-sensitive food product is exposed to the UHT treatment for just a few seconds. Microbial inactivation is achieved, and yet the food product suffers minimal or greatly reduced damage as compared to conventional heat treatments. The UHT-treated food is then packaged in pre-sterilized containers, but the containers have been cooled, so that they do not add to the heat-history of the food product. Unfortunately, as indicated above, UHT sterilization does not kill bacterial spores.

Relatively recently, considerable interest has been shown in sugar esters as food preservatives, particularly the mono- and di-saccharide sugars (glucose, fructose, mannose, galactose, sucrose, etc.). These esters are typically tasteless, odorless, and non-toxic; moreover they are essentially non-polluting due to their high degree of biodegradability. In addition to food preservation, apparently because of bacteriostatic effects, saccharide esters can mimic the effects of fat and provide useful emulsifying effects. However, there has as yet been no reports in the literature suggesting that saccharide esters can be bactericidal. Accordingly, in the food preservation field, these esters appear to be of primary importance for their ability to control, rather than eliminate, bacterial populations.

Accordingly, there is still a serious additional need for treatments which eliminate or virtually eliminate food-spoilage microorganisms, particularly those of the spore-forming type, from temperature-sensitive foods or foodstuffs.

The following references provide background information on modified-atmosphere (hermetic sealing), thermal processing, irradiation, and UHT sterilization:

Calderon, M., *Food Preservation by Modified Atmospheres,* CRC Press, 1990, pages 4 to 8;

David, Jairus, *Aseptic Processing and Packaging of Food,* CRC Press, 1996, pages 4 to 19;

*Safeguarding the Food Supply Through Irradiation Processing Techniques,* International Conference of Agricultural Research Institute, Orlando, Fla., 1992, pages 1 to 28;

*Safety and Nutritional Adequacy of Irradiated Food,* World Health Organization, Geneva, 1994, pages 22 to 28.

SUMMARY OF THE INVENTION

It was now been discovered that a combination of superatmospheric pressure, a saccharide ester, and very moderate temperatures (below the range of cooking temperatures) has major bactericidal effects, particularly upon sporulated or sporeforming microorganisms (e.g. bacilli such as *B. subtilis*), in treatments lasting a relatively short time. This discovery is surprising, since these three factors alone (pressure, saccharide esters, moderate temperatures elevated above room temperature, e.g. above about 35° C.), and various combinations of these three factors—with the sole exception of all three factors together—appear to have negligible, if any, biocidal effects against these spores. Although this invention is not bound by any theory, it appears that the three factors mentioned above, given a very modest amount of time, work synergistically to break down spore components and possibly vegetative envelope components as well. Bactericidal effects begin to appear in less than 5 or 10 minutes, and when the treatment lasts at least 10 minutes, the elimination of sporeforming bacteria and/or their spores has progressed to a major extent and can be complete or essentially complete. Beyond this modest time requirement, the treatment time does not appear to be critical, but treatment times longer than about an hour are not economical and are hence undesirable for that reason.

Although superatmospheric hydrostatic pressure, even pressure in the thousands of atmospheres, appears to inflict essentially no damage upon most types of spores, even at elevated temperatures such as 45° C., and even though saccharide esters are, apparently, not known to have significant wide-range biocidal effects, the high pressures used in the process of this invention, at the mildly elevated temperatures utilized in this invention, appear to cause the saccharide ester to have sporicidal effects vs. bacilli.

The terms "foods" and "foodstuffs" are used substantially synonymously in this application, the only difference being that "foods" are considered to include edible materials at any stage of processing, whereas "foodstuffs" are more likely to be in raw or partially processed form. Foods and foodstuffs suitable for treatment by this process include raw and processed edible (preferably human-edible) materials which are acidic (2<pH<7)—preferably mildly acidic, neutral, or very mildly basic (e.g. pH≦about 8) and which are liquid, semi-liquid, or semi-solid (e.g. foods having a liquid component or which lack rigidity and firm texture such as gravies, jams or jellies, fruit and fruit-based deserts, gelatin products and gelatin deserts, salad dressings, dips, salsa and other flavoring mixes, etc.). The liquids, semi-solids, and semi-liquids can be expected to resist denaturing or other adverse effects (e.g. upon flavor, color, aroma, or nutrient value) which might result from the application of high hydrostatic pressure. Certain solid foods are also resistant to adverse changes in flavor or nutrient value (and can also resist changes in color and aroma), particularly stews and meats, and can be treated in accordance with this invention in much the same manner as semi-solids.

Strongly acid foods (2<pH<5) are of less concern, in the context of this invention, as compared to mildly acid and neutral foods.

DETAILED DESCRIPTION

The process of this invention could be considered a form of "cold pasteurization", since the temperatures employed are well below biocidal temperatures, particularly for spores.

The Saccharide Ester

A key aspect of this invention was the discovery that saccharide esters, normally suitable essentially as bacteriostatic agents, can be bactericidal under the conditions employed in this invention. Although this invention is not bound by any theory, it is presently believed that the saccharide ester, in a high hydrostatic pressure environment, interacts with spore layers to disrupt the protective effect of the spore structure and thereby expose the spore to severe damage, e.g. from the high pressure. Sporeforming microorganisms, as indicated above, are typically bacteria, including bacteria of the Bacillus family, e.g. *B. subtilis.* In foods or foodstuffs treated according to this invention, the sporeforming microorganisms can be present in sporulated and/or vegetative form; the invention is effective against these organisms regardless of their state of sporulation.

The preferred saccharide esters are derived by esterifying monosaccharides or disaccharides, most preferably disaccharides, such as sucrose, $C_{12}H_{22}O_{11}$, which is made up of one hexose unit linked to a furanose unit:

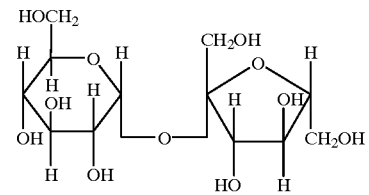

An important structural feature of the sucrose molecule is its three methylol groups ($-CH_2OH$), all of which are sterically unhindered and are easier to esterify with carboxylic acid esterifying agents (e.g. carboxylic acids, carboxylic acid halides, and carboxylic acid anhydrides) than are the five ring-substituted hydroxyl groups. Thus, although sucrose can be esterified completely to the octa-ester, the mono-ester tends to form first, followed by the di- and tri-esters. The saccharide esters of this invention are preferably mono-, di-, and/or tri-esters, and it is further preferred that the mono-ester content of the esterified product be at least 10% by weight of the total product, essentially the balance being di- and tri-esters. In a particularly preferred embodiment of this invention, the major amount by weight of the esterified disaccharide is the mono-ester, and a mono-ester content as high as about 80 or 90% by weight is particularly useful. It is not necessary, however, to eliminate all of the higher ester content, nor is it practical. Thus, the total amount of di- and/or tri-ester content is generally not less than about 10% by weight.

Generally speaking, the hydrophile/lipophile balance (HLB) of saccharide esters is affected by the number of hydroxyl groups esterified, and the higher esters (particularly sucrose octa-esters) can be extremely lipophilic—probably too lipophilic to have sufficient biocompatibility with the target for attack. It presently appears that a certain amount of both hydrophilic and lipophilic properties are desirable for the purpose of breaking down the integrity of the spore, and the HLB of disaccharide monoesters, di-esters, and tri-esters appears to be in approximately the correct range for achieving the objectives of this invention.

Another factor which affects biocompatibility and the HLB range is the nature of the carboxylic acid residue of the ester groups. Straight-chain fatty acids are preferred, and the HLB is considered too low in lipophilic properties if the carbon chain of the fatty residue has less than about 8 carbons. The hydrocarbon character of fatty acids having a chain longer than about 24 carbons, on the other hand, is believed to be excessive. The peak values for good HLB balance and compatibility with spore components are believed to lie in the range of fatty acid residues having about 10 to about 20 carbon atoms. Although both saturated and unsaturated straight-chain fatty acid residues are suitable in the context of this invention, the preferred residues are saturated (e.g. lauric, palmitic, myristic, and stearic acids).

Especially good results have been obtained with a sucrose laurate containing about 70 to 80% of the monoester, essentially the balance being di- and/or tri-ester. The preferred esterification site is the methylol group of the hexose unit of the sucrose molecule.

Thus, a preferred embodiment of sucrose ester is represented by formula I (I)

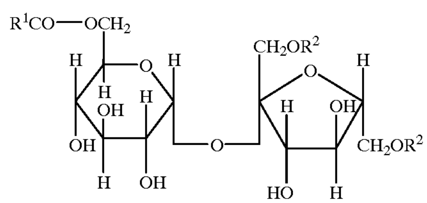

where $R^1$ is an alkyl group having from 10 to 20 (especially 12 to 18) carbon atoms, and $R^2$ and $R^3$ are H or, less preferably, $C_{10}$–$C_{20}$-alkyl.

The most effective way of carrying out the process of this invention in the presence of the saccharide ester is to add the saccharide ester to the food or foodstuff, prior to processing, in generally the conventional ways that food additives are introduced. For example in the case of liquid and semi-liquid foods, the additive can be thoroughly blended with the food using a mixer. Since the saccharide esters are available in powder and waxy forms, solid foods such as meats can be given a very complete surface coating of the ester.

Typical amounts of saccharide ester added to the food or foodstuff prior to processing range from about 0.1 parts by weight per 100 parts by weight of product (0.1 phr) to about 1.0 phr.

Processing Conditions

As noted previously, foods and foodstuffs selected for treatment according to this invention are generally not harmed by high hydrostatic pressure. However, it is well known in the food art that some changes in flavor, aroma, and color can occur during food processing without rendering the food unsuitable for sale and consumption. The most serious adverse processing changes are considered to be major loss of nutrient value and the creation of unacceptable flavors.

To impart bactericidal properties to the saccharide ester, the superatmospheric hydrostatic pressure should be very high—in the thousands of atmospheres, e.g above 3,000 atmospheres (above about 310 MPa). Optimum results have been obtained with about 4,000 atmospheres (about 410 MPa). Still higher pressures can be used, but do not appear to provide any additional advantages.

Although this invention is not bound by any theory, it is believed that the function of the treatment temperature has less to do with outright killing of bacteria than it does with facilitating the interaction between the saccharide ester and the spore cortex. Accordingly, it is not necessary that the temperature at which the process is conducted be significantly above 35 or even 37° C. Even a temperature of only 40° C. will, apparently, facilitate this interaction. The optimum temperature appears to be as low as about 40 to 50° C. Higher temperatures can be used (e.g 60° or more), but they do not appear to confer any significant advantage, and they increase the risk of lowering sensory quality or reducing the nutrient value of the product. Accordingly, this invention appears to be ideally suited to the treatment of foodstuffs which are not adversely affected by pressure but which are subject to heat denaturization.

The effectiveness of temperatures utilized in this invention is believed to be surprising, since, in the absence of the high hydrostatic pressure and the saccharide ester, thermal treatments in the 100 to 250° C. range are normally required to have a significant impact upon a spore population. As noted previously, there are many foods and foodstuffs which cannot be heated to such high temperatures without detracting seriously from their commercial value.

Treatment times have been discussed previously. Generally speaking, the treatment (especially the pressure, which is the most difficult to maintain) can be continued until the spore integrity have been substantially totally disrupted or broken down. Microorganisms in the vegetative state are also essentially destroyed. Further continuation of the treatment beyond this point adds cost and complexity without significantly improving the product of the process. For example, treatment times longer than 60 minutes appear to serve no important purpose and are wasteful of energy and equipment time. Essential elimination of the sporeforming organisms, whether in spore form or in the vegetative state, has been observed with treatment times as short as about ten minutes. Where less complete elimination of these microorganisms can be tolerated, times shorter than 10 minutes can be used, but apparently, very little is accomplished in less than about 2 minutes. Treatment times of at least 5 minutes are preferred.

The design of continuous processing equipment which provides a highly pressurized zone is complex, hence batch or semi-continuous processing is preferred for use in this invention. The application of very high hydrostatic pressures in a sealed, pressurized chamber or zone can be readily provided with commercially available batch-processing equipment, and the temperatures required by this invention pose no additional difficulties.

Post-Treatment Considerations

When the high-pressure treatment of this invention is completed, the pressure can be released, e.g. to normal ambient temperature, by unsealing or depressurizing the pressurized chamber. The temperature of the resulting treated product can be maintained at 35° C. or higher for a short time after treatment, but it is often most desirable to refrigerate the product after pressure treatment. Cooling of the treated product to refrigeration or freezing temperatures below 15° C. (e.g. −20 to 10° C.) is generally preferred.

Deep freezing to temperatures as low as −60° C. can also be used. The product is thus preferably kept under refrigeration for storage or shipping.

EXAMPLE

Microbiological media representing model foods and containing a significant population of bacterial spores were blended with 0.1% of sucrose laurate type L-1695 (Ryoto Sugar Ester, a product of Mitsubishi Chemical Corporation). The L-1695 sucrose laurate is a waxy powder having an HLB value of 16 and contains 80% of the mono-laurate (the esterification being on the methylol group of the hexose unit of the sucrose). Essentially the balance of the Ryoto product is believed to be sucrose di-laurate and/or sucrose tri-laurate. The medium containing the sucrose laurate was placed in a mildly heated pressure unit and subjected to 4,000 atmospheres (410 MPa) for ten minutes at 45° C. The pressure was released, and the samples are removed from the pressure unit. Substantially complete elimination of the spore population was observed.

What is claimed is:

1. A process for treating food, comprising the step of: subjecting the food to a superatmospheric pressure which has bactericidal effects in the presence of a saccharide monocarboxylic acid ester which comprises at least 10% by weight of a mono-ester of the formula I

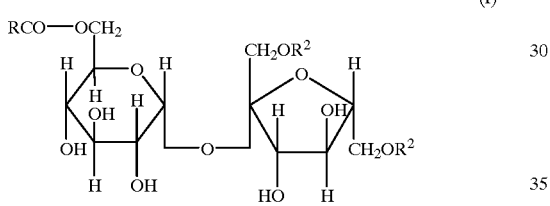

wherein R is an alkyl group having from 10 to 20 carbon atoms, essentially the balance of said monocarboxylic acid ester being a corresponding diester or triester or mixture thereof and at a temperature above room temperature but below the temperature at which the food will be adversely affected in flavor or nutrient content by heat denaturization.

2. The process according to claim 1, wherein the food contains sporulated or sporeforming microorganisms or a mixture thereof, wherein said temperature is above about 37° C., wherein saccharide monocarboxylic acid ester comprises a monoester of a $C_8$- to $C_{24}$-carboxylic acid, and wherein said superatmospheric pressure and said temperature are maintained until the sporulated microorganisms and sporeforming microorganisms or mixtures of sporeforming and sporulated microorganisms in said food are essentially eliminated.

3. The process according to claim 2, wherein the saccharide of said monocarboxylic acid ester is a disaccharide.

4. The process as claimed in claim 1, wherein said food is liquid, semi-liquid, semi-solid having a liquid component or which lacks rigidity.

5. The process as claimed in claim 4, wherein said food is gravy, jam, jelly, fruit, fruit-based desert, a gelatin product, a salad dressing, a dip, salsa, flavoring mix, stew or meat.

6. A process for essentially eliminating, from a food, at least one population of sporeforming microorganisms, whether in sporulated and/or vegetative form, said process comprising:

a. mixing a liquid, semi-liquid, or semi-solid food which essentially lacks the rigidity of a solid food and which contains at least one population of said spore forming microorganisms with a saccharide ester composition, said saccharide ester composition comprising at least 10% by weight of a mono-ester of the formula I

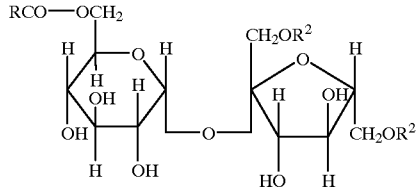

wherein R is an alkyl group having from 10 to 20 carbon atoms, essentially the balance of said saccharide ester being a corresponding diester or triester or mixture thereof, b. subjecting the food containing said saccharide ester composition to superatmospheric hydrostatic pressure and to a temperature above room temperature but below the temperature at which the food will be adversely affected in flavor or nutrient content by heat denaturization, said superatmospheric hydrostatic pressure and said temperature being maintained until said population of sporeforming microorganisms, whether in sporulated or vegetative form, has been essentially eliminated, c. releasing said superatmospheric hydrostatic pressure, and d. recovering the resulting treated food which is essentially free of sporeforming microorganisms, whether in sporulated or vegetative form.

7. The process according to claim 6, wherein said superatmospheric hydrostatic pressure is approximately 4,000 atmospheres, and said temperature ranges from about 40 to about 50° C.

8. The process according to claim 7, wherein the saccharide of said saccharide monocarboxylic acid ester is a disaccharide.

9. The process as claimed in claim 8, wherein said compound of formula I consists essentially of sucrose monolaurate, and wherein said disaccharide monocarboxylic acid ester comprises a major amount of said compound of formula I.

10. The process as claimed in claim 6, wherein said saccharide monocarboxylic acid ester comprises at least 10% by weight of a $C_{10}$–$C_{20}$-carboxylic acid mono-ester of sucrose, essentially the balance of said saccharide monocarboxylic acid ester being a corresponding di-ester or tri-ester or mixture thereof.

11. The process according to claim 6, comprising the steps of:

a. adding said saccharide monocarboxylic acid ester to said food, b. subjecting the food containing said saccharide monocarboxylic acid ester to said superatmospheric hydrostatic pressure at a temperature in the range of about 40 to about 50° C., and c. releasing said superatmospheric hydrostatic pressure after a period of time exceeding 5 minutes but not exceeding about 60 minutes.

12. The process according to claim 11, wherein said saccharide monocarboxylic acid ester is a sucrose mono-, di-, or tri-ester, or a mixture thereof, and the monocarboxylic acid residue of said monocarboxylic acid ester is a fatty acid having from about 10 to about 20 carbon atoms.

13. A process according to claim 6, wherein said saccharide ester composition contains a minor amount of di-ester, a minor amount of a tri-ester, or a mixture thereof, said di-ester and tri-ester being $C_8-C_{24}$-carboxylate esters.

14. A process according to claim 6, wherein, in said step b, said superatmospheric hydrostatic pressure and said temperature are maintained for a period of time exceeding five minutes but not exceeding about 60 minutes.

15. A process according to claim 6, wherein said food is capable of withstanding superatmospheric pressure in excess of 3,000 atmospheres without being adversely affected in flavor or nutrient value, and wherein said superatmospheric hydrostatic pressure applied during said step b is greater than 3,000 atmospheres.

16. A process according to claim 6, wherein said temperature is greater than about 37° C.

17. A process according to claim 16, wherein said temperature is greater than about 40 but less than about 60° C.

18. A process according to claim 6, wherein, in said step a, the food is mixed with sucrose monoester, said sucrose monoester optionally containing sucrose di-ester and/or tri-ester, said sucrose monoester, di-ester, and tri-ester being $C_{10}-C_{20}$-carboxylates.

19. The process according to claim 6, wherein said compound of formula I consists essentially of sucrose monolaurate.

20. A process according to claim 6, wherein the minor amount of said saccharide ester composition is about 0.1 to about 1 part of said composition per 100 parts of said food.

21. The process according to claim 6, comprising the additional steps of decreasing said superatmospheric hydrostatic pressure to approximately normal ambient pressure, cooling the resulting treated food to a refrigeration temperature below about 15° C., and maintaining the resulting treated food at the refrigeration temperature for storing or shipping.

22. A process for essentially eliminating, from a solid food, at least one population of sporeforming microorganisms. whether in sporulated and/or vegetative form, said process comprising:

a. coating the surface of a solid food which contains at least one population of said sporeforming microorganisms with a powdered or waxy sucrose-$C_{10}-C_{20}$-carboxylate, b. subjecting the food thus coated with said saccharide ester composition and wherein said saccharide ester composition comprises at least 10% by weight of a monoester of the formula I

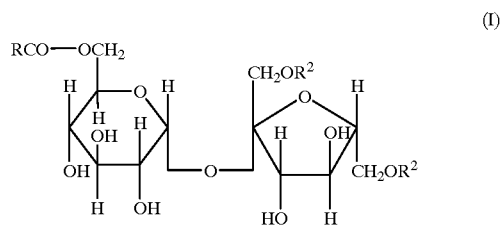

(I)

wherein R is an alkyl group having from 10 to 20 carbon atoms, essentially the balance of said saccharide monocarboxylic acid ester being a corresponding diester or triester or mixture thereof, to superatmospheric hydrostatic pressure and to a temperature above room temperature but below the temperature at which the food will be adversely affected in flavor or nutrient content by heat denaturization, said superatmospheric hydrostatic pressure and said temperature being maintained until said population of sporeforming microorganisms, whether in sporulated or vegetative form, has been essentially eliminated, c. releasing said superatmospheric hydrostatic pressure, and d. recovering the resulting treated food which is essentially free of sporeforming microorganisms, whether in sporulated or vegetative form.

* * * * *

UNITED STATES PATENT AND TRADEMARK OFFICE
CERTIFICATE OF CORRECTION

PATENT NO. : 6,110,516
DATED : August 29, 2000
INVENTOR(S) : Hoover et al.

It is certified that error appears in the above-identified patent and that said Letters Patent is hereby corrected as shown below:

Column 7,
Lines 27-37 (Claim 1),

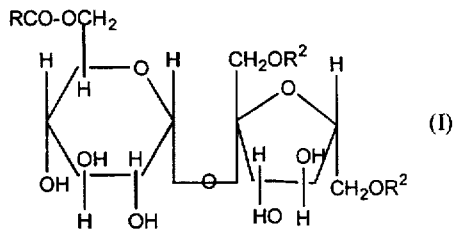

should read,

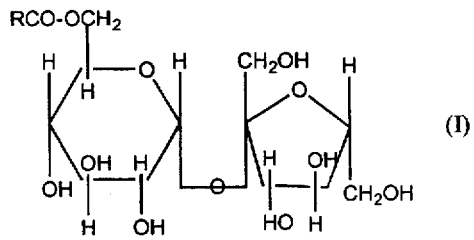

Column 8,
Lines 7-15 (Claim 6),

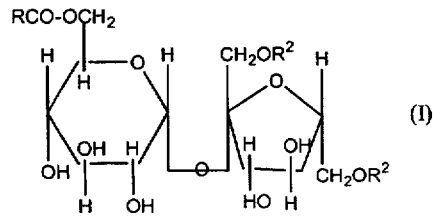

should read

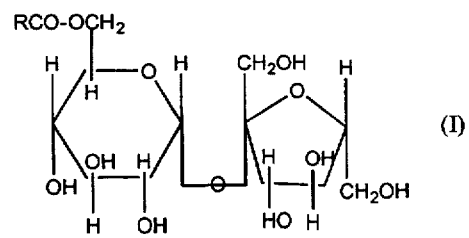

UNITED STATES PATENT AND TRADEMARK OFFICE
CERTIFICATE OF CORRECTION

PATENT NO. : 6,110,516
DATED : August 29, 2000
INVENTOR(S) : Hoover et al.

Page 2 of 2

It is certified that error appears in the above-identified patent and that said Letters Patent is hereby corrected as shown below:

Column 10
Line 10 (claim 22), "monoester" should read -- mono-ester --.
Lines 12-22 (Claim 22),

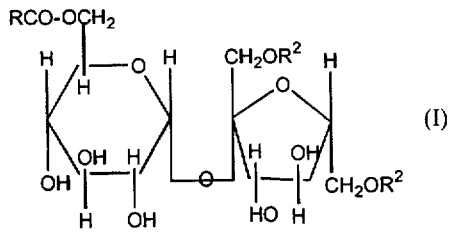

should read,

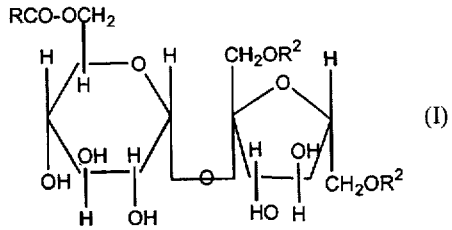

Signed and Sealed this

Sixteenth Day of October, 2001

Attest:

*Attesting Officer*

NICHOLAS P. GODICI
*Acting Director of the United States Patent and Trademark Office*